(12) United States Patent
Becker et al.

(10) Patent No.: US 12,324,372 B2
(45) Date of Patent: Jun. 10, 2025

(54) AGRICULTURAL HARVESTER WITH SHAKEABLE POSITIVE TRANSPORT CONVEYOR

(71) Applicant: CNH Industrial America LLC, New Holland, PA (US)

(72) Inventors: Justin Becker, Elizabethtown, PA (US); Robert Garrett, Conestoga, PA (US); Michael Wenger, Terre Hill, PA (US); Eric L. Walker, Narvon, PA (US); Zachary Harmon, East Earl, PA (US); Brian Abreu, Reinholds, PA (US)

(73) Assignee: CNH Industrial America LLC, Holland, PA (US)

( * ) Notice: Subject to any disclaimer, the term of this patent is extended or adjusted under 35 U.S.C. 154(b) by 732 days.

(21) Appl. No.: 17/559,252

(22) Filed: Dec. 22, 2021

(65) Prior Publication Data

US 2023/0189709 A1  Jun. 22, 2023

(51) Int. Cl.
*A01D 41/127* (2006.01)
*A01D 75/28* (2006.01)
*A01F 12/44* (2006.01)

(52) U.S. Cl.
CPC ..... *A01D 41/1276* (2013.01); *A01D 41/1274* (2013.01); *A01D 75/282* (2013.01); *A01F 12/446* (2013.01)

(58) Field of Classification Search
CPC ............ A01D 41/1274; A01D 41/1276; A01D 75/282; A01F 12/00; A01F 12/44; A01F 12/46; A01F 12/444; A01F 12/446
See application file for complete search history.

(56) References Cited

U.S. PATENT DOCUMENTS

| 4,253,471 | A | 3/1981 | Klimmer |
| 9,750,193 | B2 * | 9/2017 | Bonte ............... A01F 12/46 |
| 9,814,184 | B2 * | 11/2017 | Ricketts ............ A01F 12/446 |
| 10,111,386 | B2 | 10/2018 | Farley et al. |
| 10,512,217 | B2 * | 12/2019 | Puvak ............... A01F 12/44 |
| 2020/0137959 | A1 * | 5/2020 | Ricketts ............ A01F 12/00 |

FOREIGN PATENT DOCUMENTS

| DE | 24 54 315 A1 | 5/1976 |
| GB | 363570 | 12/1931 |

* cited by examiner

*Primary Examiner* — Adam J Behrens
*Assistant Examiner* — Robert E Pezzuto
(74) *Attorney, Agent, or Firm* — Peter K. Zacharias; Rebecca L. Henkel; Rickard K. DeMille

(57) ABSTRACT

A cleaning system for an agricultural harvester includes: at least one sieve; a cleaning blower directed at the at least one sieve and configured to supply a cleaning air flow directed at the at least one sieve; and a conveyor assembly configured to supply crop material to the at least one sieve. The conveyor assembly includes: a conveyor frame; a shaker coupled to the conveyor frame and configured to shake the conveyor frame; and an endless conveyor carried by the conveyor frame and including a conveyor loop with a substantially solid surface and a conveyor driver coupled to the conveyor loop, the conveyor driver being configured to selectively rotate the conveyor loop.

17 Claims, 6 Drawing Sheets

AGRICULTURAL HARVESTER WITH SHAKEABLE POSITIVE TRANSPORT CONVEYOR

FIELD OF THE INVENTION

The present invention pertains to an agricultural harvester and, more specifically, to a conveyor assembly for an agricultural harvester.

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan or similar element blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

More particularly, a rotary threshing or separating system includes one or more rotors that can extend axially (front to rear) or transversely (side to side) within the body of the combine, and which are partially or fully surrounded by perforated concaves. The crop material is threshed and separated by the rotation of the rotor within the concaves. Coarser non-grain crop material such as stalks and leaves pass through a straw beater to remove any remaining grains, and then are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve), where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material which passes through the upper sieve, but does not pass through the lower sieve, is directed to a tailings pan. Grain falling through the lower sieve lands on a bottom pan of the cleaning system, where it is conveyed forwardly toward a clean grain auger. The clean grain auger conveys the grain to a grain elevator, which transports the grain upwards to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Crop material flow rate within the agricultural harvester depends on a variety of factors. When the harvester travels through an area of a field that is densely occupied by crop material, the crop material flow rate increases, and vice versa. Non-uniform crop material flow rate into the harvester can affect the efficiency of the harvester due to, for example, sudden influxes of crop material overwhelming certain systems within the harvester. Periods of low crop material flow can also detrimentally affect efficiency of the harvester due to crop material not moving efficiently within the harvester.

What is needed in the art is an agricultural harvester that can address one or more of the previously described issues with known agricultural harvesters.

SUMMARY OF THE INVENTION

Exemplary embodiments disclosed herein provide a cleaning system for an agricultural harvester with an endless conveyor that is carried by a conveyor frame coupled to a shaker and has a conveyor driver that can selectively rotate a conveyor loop.

In some exemplary embodiments provided according to the present disclosure, a cleaning system for an agricultural harvester includes: at least one sieve; a cleaning blower directed at the at least one sieve and configured to supply a cleaning air flow directed at the at least one sieve; and a conveyor assembly configured to supply crop material to the at least one sieve. The conveyor assembly includes: a conveyor frame; a shaker coupled to the conveyor frame and configured to shake the conveyor frame; and an endless conveyor carried by the conveyor frame and including a conveyor loop with a substantially solid surface and a conveyor driver coupled to the conveyor loop, the conveyor driver being configured to selectively rotate the conveyor loop.

In some exemplary embodiments provided according to the present disclosure, an agricultural harvester includes: a chassis; a threshing and separating system carried by the chassis, the threshing and separating system including a threshing rotor that is rotatable within a concave; and a cleaning system including: at least one sieve; a cleaning blower directed at the at least one sieve and configured to supply a cleaning air flow directed at the at least one sieve; and a conveyor assembly configured to supply crop material to the at least one sieve. The conveyor assembly includes: a conveyor frame; a shaker coupled to the conveyor frame and configured to shake the conveyor frame; and an endless conveyor carried by the conveyor frame and including a conveyor loop with a substantially solid surface and a conveyor driver coupled to the conveyor loop, the conveyor driver being configured to selectively rotate the conveyor loop.

One possible advantage that may be realized by exemplary embodiments provided according to the present disclosure is that the conveyor assembly may act as a shaking grain pan when the conveyor driver is not rotating the conveyor loop but also provide positive crop material transport when the conveyor driver selectively rotates the conveyor loop.

Another possible advantage that may be realized by exemplary embodiments provided according to the present disclosure is that the conveyor driver can be controlled to adjust positive crop material transport responsively to different harvesting conditions.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
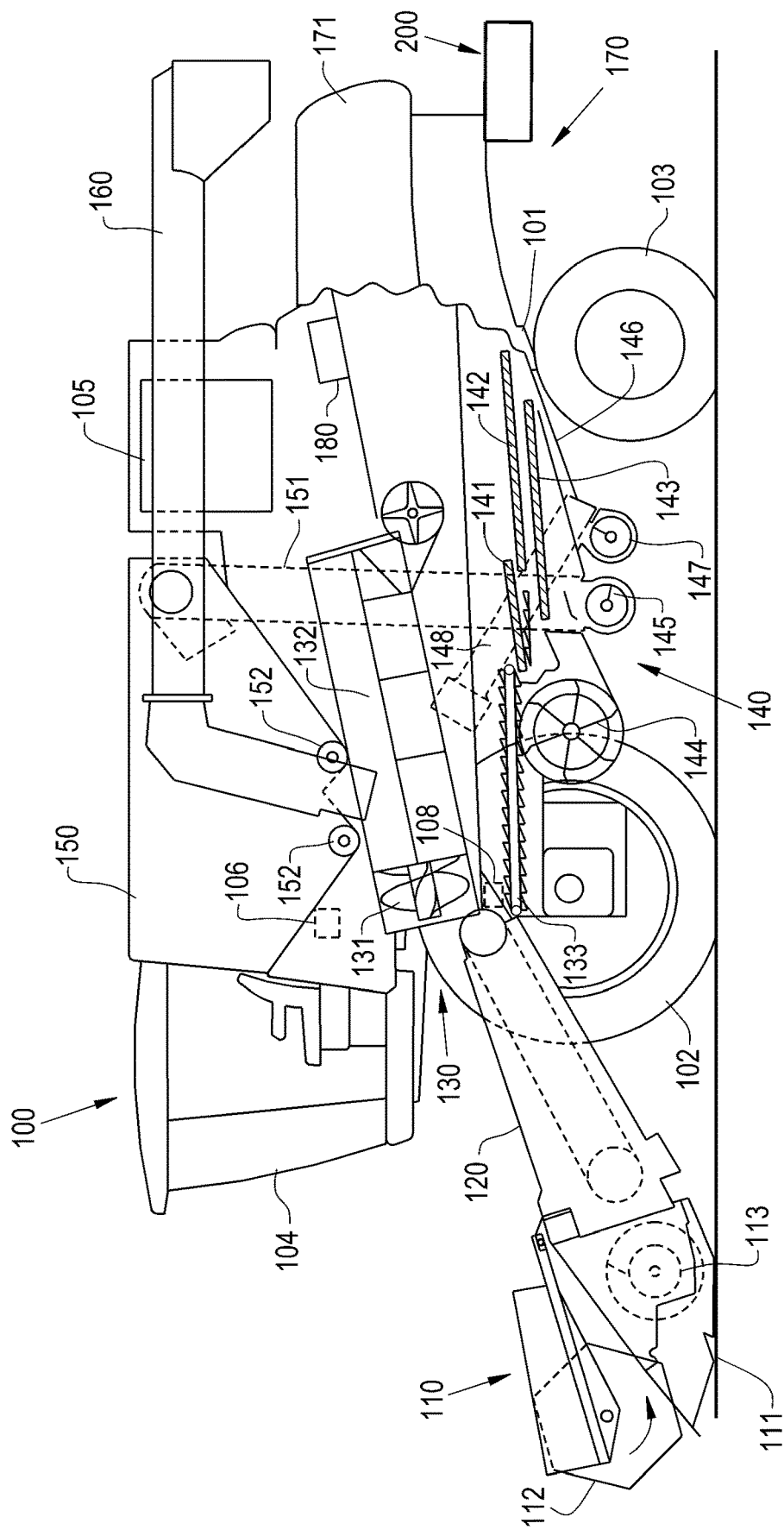
FIG. 1 illustrates a side view of an agricultural vehicle, the agricultural vehicle comprising a cleaning system, in accordance with an exemplary embodiment of the present disclosure.
Figure 2:
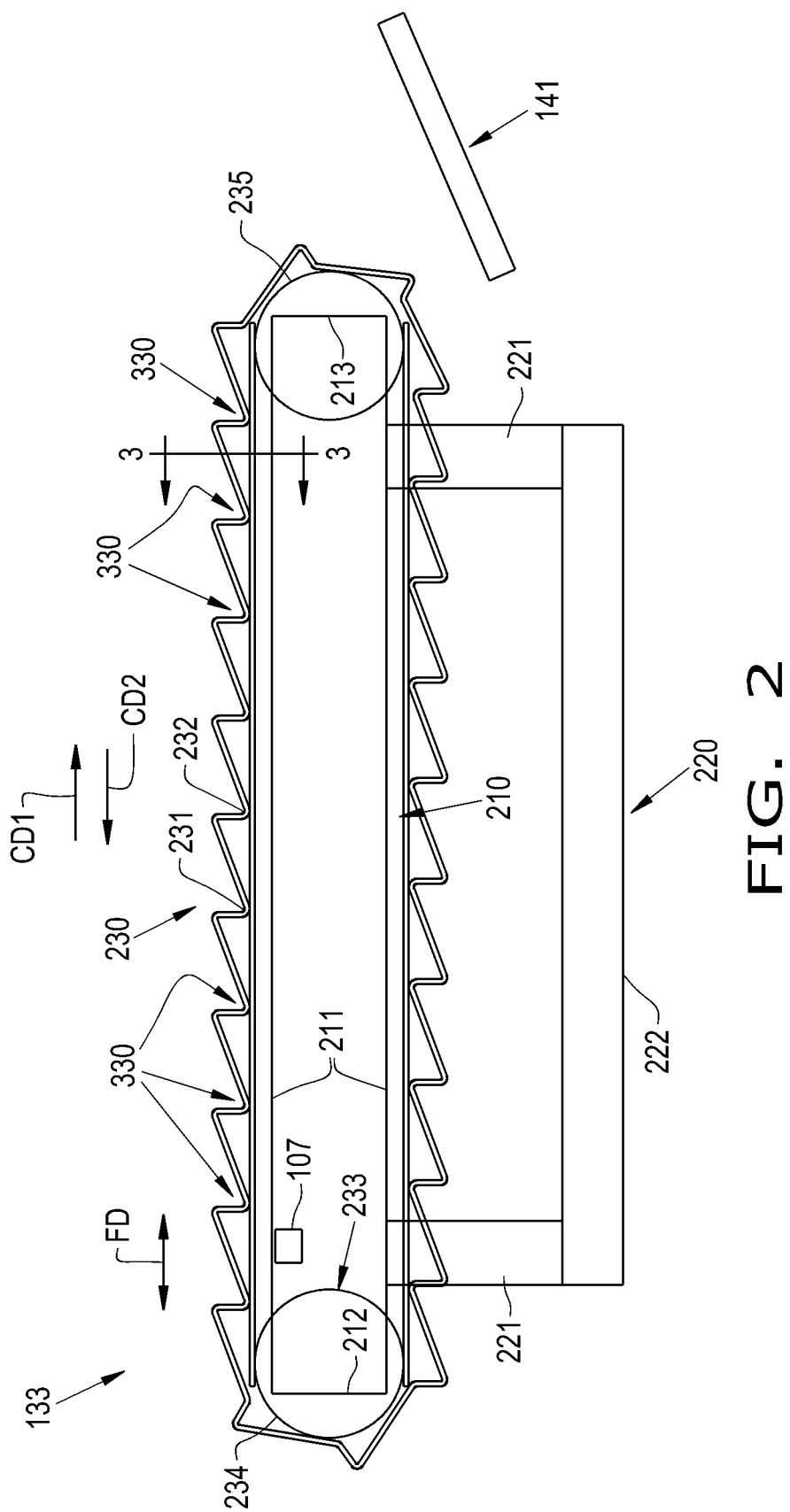
FIG. 2 illustrates a side view a portion of the cleaning system of the agricultural harvester of FIG. 1, in accordance with an exemplary embodiment of the present disclosure.

Referring now to the drawings, and more particularly to FIG. 1, there is shown an embodiment of an agricultural harvester 100 in the form of a combine which generally includes a chassis 101, ground engaging wheels 102 and 103, header 110, feeder housing 120, operator cab 104, threshing and separating system 130, cleaning system 140, grain tank 150, and unloading conveyance 160. Front wheels 102 are larger flotation type wheels, and rear wheels 103 are smaller steerable wheels. Motive force is selectively applied to front wheels 102 through a power plant in the form of a diesel engine 105 and a transmission (not shown). Although combine 100 is shown as including wheels, is also to be understood that combine 100 may include tracks, such as full tracks or half tracks.

Header 110 is mounted to the front of combine 100 and includes a cutter bar 111 for severing crops from a field during forward motion of combine 100. A rotatable reel 112 feeds the crop into header 110, and a double auger 113 feeds the severed crop laterally inwardly from each side toward feeder housing 120. Feeder housing 120 conveys the cut crop to threshing and separating system 130, and is selectively vertically movable using appropriate actuators, such as hydraulic cylinders (not shown).

Threshing and separating system 130 is of the axial-flow type, and generally includes a threshing rotor 131 at least partially enclosed by a rotor cage and rotatable within a corresponding perforated concave 132. The cut crops are threshed and separated by the rotation of rotor 131 within concave 132, and larger elements, such as stalks, leaves and the like are discharged from the rear of combine 100. Smaller elements of crop material including grain and non-grain crop material, including particles lighter than grain, such as chaff, dust and straw, are discharged through perforations of concave 132. Threshing and separating system 130 can also be a different type of system, such as a system with a transverse rotor rather than an axial rotor, etc.

Grain which has been separated by the threshing and separating assembly 130 falls onto a conveyor assembly 133, which is part of cleaning system 140. Cleaning system 140 may include an optional pre-cleaning sieve 141, an upper sieve 142 (also known as a chaffer sieve or sieve assembly), a lower sieve 143 (also known as a cleaning sieve), and a cleaning blower 144, which may be a fan or similar element. Grain on sieves 141, 142 and 143 is subjected to a cleaning action by blower 144 which provides an air flow through the sieves to remove chaff and other impurities such as dust from the grain by making this material airborne for discharge from a straw hood 171 of a residue management system 170 of combine 100. Optionally, the chaff and/or straw can proceed through a chopper 180 to be further processed into even smaller particles before discharge out of the combine 100 by a spreader assembly 200. It should be appreciated that the "chopper" 180 referenced herein, which may include knives, may also be what is typically referred to as a "beater", which may include flails, or other construction and that the term "chopper" as used herein refers to any construction which can reduce the particle size of entering crop material by various actions including chopping, flailing, etc. Conveyor assembly 133 and pre-cleaning sieve 141 may oscillate in a fore-to-aft manner to transport the grain and finer non-grain crop material to the upper surface of upper sieve 142. Upper sieve 142 and lower sieve 143 are vertically arranged relative to each other, and likewise oscillate in a fore-to-aft manner to spread the grain across sieves 142, 143, while permitting the passage of cleaned grain by gravity through the openings of sieves 142, 143.

Clean grain falls to a clean grain auger 145 positioned crosswise below and toward the front of lower sieve 143. Clean grain auger 145 receives clean grain from each sieve 142, 143 and from a bottom pan 146 of cleaning system 140. Clean grain auger 145 conveys the clean grain laterally to a generally vertically arranged grain elevator 151 for transport to grain tank 150. Tailings from cleaning system 140 fall to a tailings auger trough 147. The tailings are transported via tailings auger 147 and return auger 148 to the upstream end of cleaning system 140 for repeated cleaning action. A pair of grain tank augers 152 at the bottom of grain tank 150 convey the clean grain laterally within grain tank 150 to unloader 160 for discharge from combine 100.

In known agricultural harvesters, there are two widely utilized ways to convey crop material that has passed through the threshing and separating system to the cleaning system. One of the ways is to utilize a grain pan that shakes fore-to-aft and side-to-side to both convey the crop material rearwardly toward the cleaning system while also stratifying the crop material. The other way is to utilize a conveyor, such as a belt conveyor, to convey the crop material toward the cleaning system. Utilizing a grain pan desirably stratifies the crop material, which can make it easier to separate MOG from grain in the cleaning system, but is susceptible to changes in crop material flow rate. If the angle of inclination of the grain pan changes, for example, the crop material can pool or otherwise not efficiently convey across the grain pan to the cleaning system. A belt conveyor, on the other hand, can be controlled so the belt conveyor is less susceptible to changes in crop material flow rate but causes minimal stratification of the crop material.

To address some of the previously described issues with known agricultural harvesters, and referring now to FIGS. 2-5, the conveyor assembly 133 is illustrated in further detail. The conveyor assembly 133 includes a conveyor frame 210, a shaker 220 coupled to the conveyor frame 210, and an endless conveyor 230 carried by the conveyor frame 210. The shaker 220 is configured to shake the conveyor frame 210, e.g., in a fore-to-aft direction FD and a lateral direction (extending into the page). The shaker 220 may be coupled to one or more frame members 211 of the conveyor frame 210 by, for example, one or more shaker arms 221. The shaker arm(s) 221 may be coupled to a shaker driver 222, e.g., an eccentric drive unit, to drive shaking movement of the conveyor frame 210. Many arrangements of shakers suitable for use in agricultural harvesters, e.g., for shaking a grain pan of the harvester, are known, and any such shaker may be provided according to the present disclosure.

The endless conveyor 230 is carried by the conveyor frame 210 so movement of the conveyor frame 210 causes a corresponding movement of the endless conveyor 230. The endless conveyor 230 includes a conveyor loop 231 including a substantially solid surface 232 and a conveyor driver 233 coupled to the conveyor loop 231. The conveyor driver 233 may include a driven roller 234 and another roller 235, which may or may not also be driven. As used herein, the surface 232 is "substantially solid" in the sense that the surface 232 is non-perforated to generally prevent air flow from passing through the surface 232 to blow out crop material, such as MOG. This is in contrast to, for example, one of the sieves 141, 142, 143, which are perforated to allow air flow to pass therethrough and remove MOG. The conveyor loop 231 may be, for example, a belt.

The conveyor driver 233 coupled to the conveyor loop 231 is configured to selectively rotate the conveyor loop 231. Selective rotation of the conveyor loop 231 by the conveyor driver 233 can speed up or slow down the rate of crop material being carried by the conveyor loop 231, which may be a mixture of grain and MOG, towards the sieve(s) 141, 142, 143. In this sense, there may be times during operation when the conveyor driver 233 is not rotating the conveyor loop 231; in some embodiments, the conveyor driver 233 is not rotating the conveyor loop 231 during the majority of operation. When the conveyor driver 233 is not rotating the conveyor loop 231, conveyance of crop material by the endless conveyor 230 may be due only to other types of movement, i.e., by the shaker 220 shaking the conveyor frame 210 to also shake the endless conveyor 230. For example, the shaker 220 may be configured to shake the conveyor frame 210 in the fore-to-aft direction FD such that crop material is supplied to the sieve(s) 141, 142, 143 from the conveyor loop 231 without rotating the conveyor loop 231, i.e., movement of the crop material by the endless conveyor 230 is due solely to the shaking action of the conveyor frame 210 and the carried endless conveyor 230. The conveyor driver 233 may be activated selectively responsively to certain conditions to adjust movement of the crop material by the endless conveyor 230, as will be described further herein.

During conveyance of crop material, the crop material may normally move in a first conveyance direction CD1 during shaking of the conveyor frame 210 and the endless conveyor 230. The first conveyance direction CD1 may extend from a front end 212 of the conveyor frame 210 toward a rear end 213 of the conveyor frame 210. The front end 212 of the conveyor frame 210 may be closer to the threshing and separating system 130 than the rear end 213 while the rear end 213 may be closer to the sieve(s) 141, 142, 143 than the front end 212. In this sense, crop material normally moves in the first conveyance direction CD1 from the threshing and separating system 130 to the sieve(s) 141, 142, 143 via the conveyor assembly 133.

Figure 3:
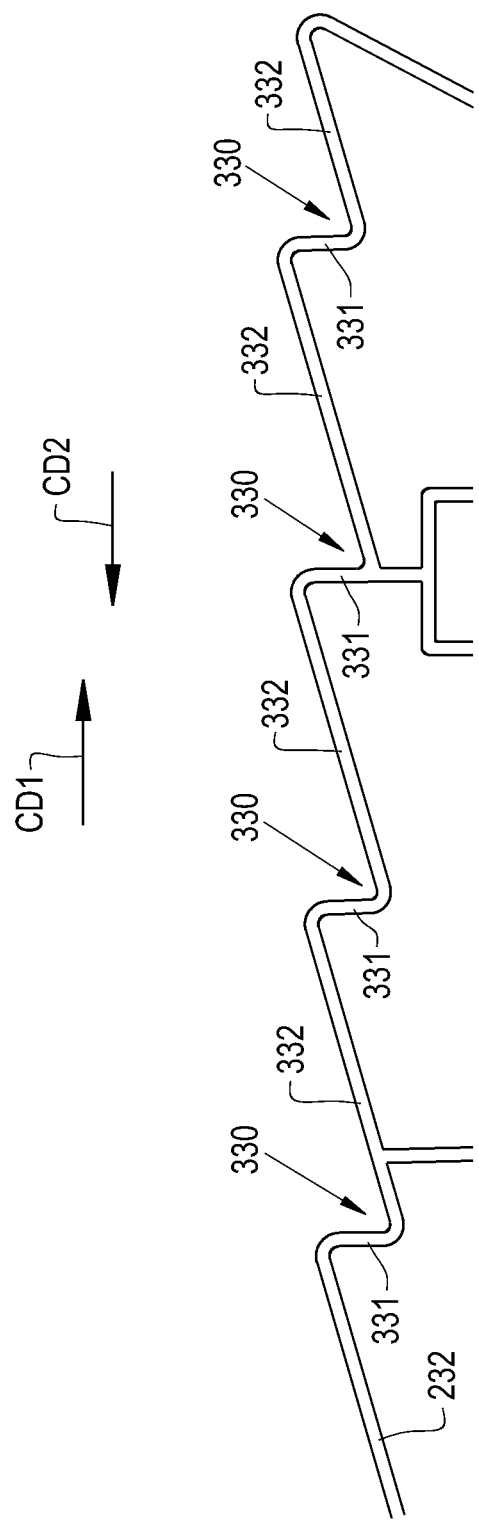
FIG. 3 illustrates a cross-sectional view of a substantially solid surface of an endless conveyor of the cleaning system of FIGS. 1-2 taken along line 3-3, in accordance with an exemplary embodiment of the present disclosure.

In some embodiments, and referring now to FIG. 3 as well, the surface 232 includes a plurality of rabbets 330 formed therein. Each of the rabbets 330 includes a pair of steps 331 that are coupled to one another by an angled portion 332 of the surface 232. The steps 331 may define respective peaks that help prevent crop material being conveyed in the first conveyance direction CD1 from moving in a second conveyance direction CD2, which is opposite to the first conveyance direction CD1 and extends from the rear end 213 of the conveyor frame 210 toward the front end 212 of the conveyor frame 210. The rabbets 330 thus reduce the likelihood of crop material conveying in the second conveyance direction CD2 back toward the threshing and separating system 130 to encourage crop material flow toward the sieve(s) 141, 142, 143.

In some embodiments, a controller 106 (illustrated in FIG. 1) is operably coupled to the conveyor driver 233 and configured to cause selective activation of the conveyor driver 233 to rotate the conveyor loop 231. For example, the controller 106 may be configured to output electrical signals to the conveyor driver 233 to directly control selective activation of the conveyor driver 233 and thus selective rotation of the conveyor loop 231 by the conveyor driver 233. The controller 106 may be configured, for example, to control the conveyor driver 233 to control a driving velocity of the conveyor loop 231 by the conveyor driver 233. The driving velocity includes both the conveyance direction CD1, CD2 of the conveyor loop 231 as well as a conveyance speed of the conveyor loop 231. The controller 106 may control the conveyor driver 233 to rotate in a first rotation direction and a second rotation direction that is opposite the first rotation direction. Rotation of the conveyor driver 233 in the first rotation direction causes the conveyor loop 231 to rotate in the first conveyance direction CD1 while rotation of the conveyor driver 233 in the second rotation direction causes the conveyor loop 231 to rotate in the second conveyance direction CD2. The controller 106 may control the conveyor driver 233 to rotate at any suitable conveyance speed to control the rotational speed of the conveyor loop 231 and thus the conveyance speed of crop material carried by the conveyor loop 231.

Figure 4:
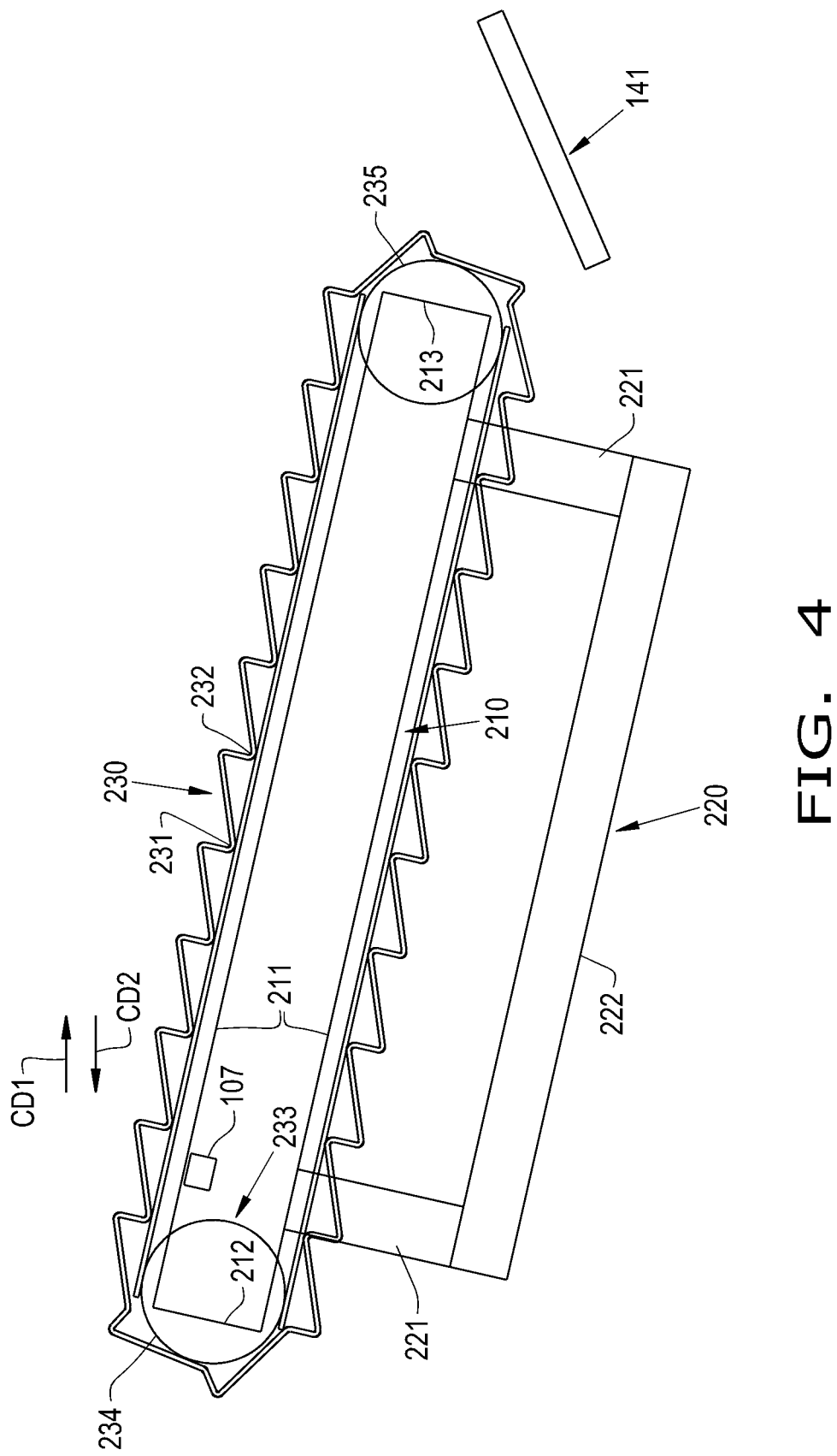
FIG. 4 illustrates a side view of the cleaning system of FIGS. 1-2 when a conveyor frame has an angle of inclination with a front end of the conveyor frame raised above a rear end of the conveyor frame, in accordance with an exemplary embodiment of the present disclosure.
Figure 5:
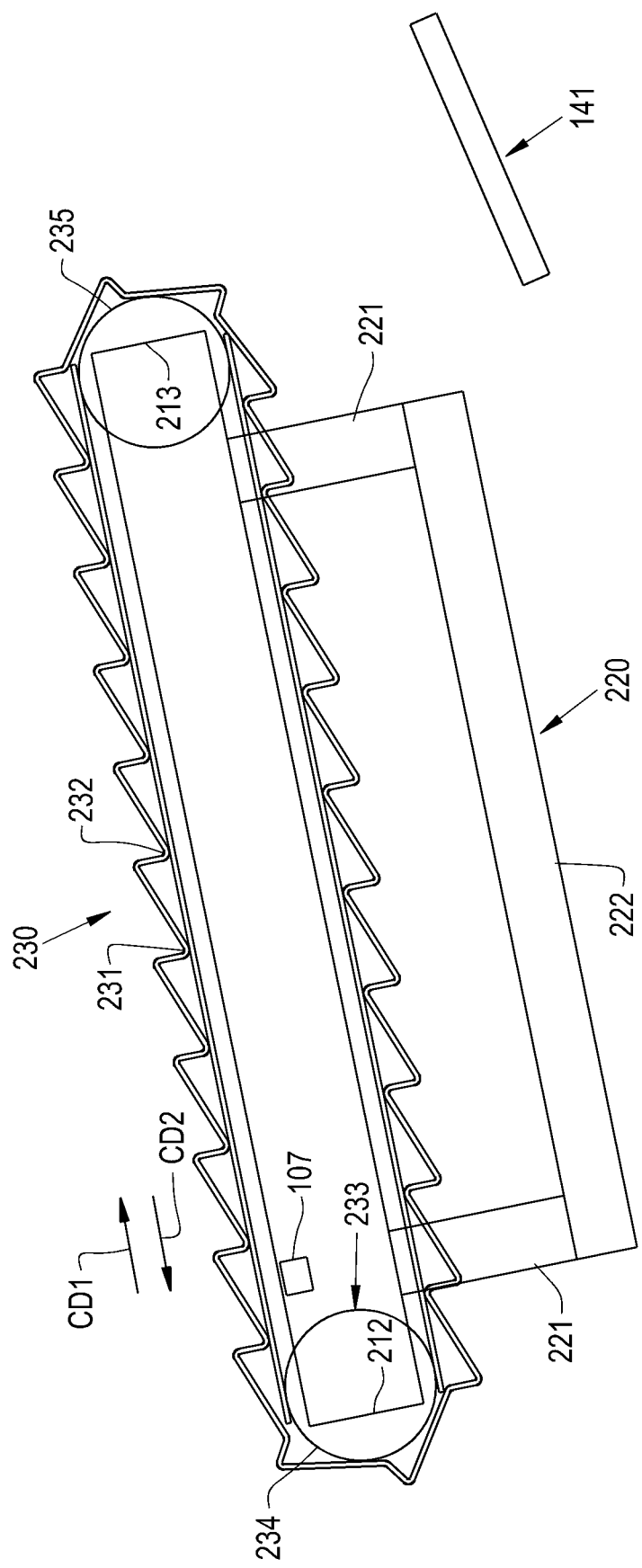
FIG. 5 illustrates a side view of the cleaning system of FIGS. 1-2 and 4 when the conveyor frame has an angle of inclination with the rear end of the conveyor frame raised above the front end of the conveyor frame, in accordance with an exemplary embodiment of the present disclosure.

Referring now to FIGS. 4-5, it is illustrated how the controller 106 may control the conveyor driver 233 to selectively rotate the conveyor loop 231 and affect crop material movement across the endless conveyor 230. The controller 106 may be configured to determine an angle of inclination of the conveyor frame 210 has changed and responsively cause a change in the driving velocity of the conveyor loop 231 by the conveyor driver 233. The controller 106 may determine the angle of inclination has changed, for example, by being operably coupled to an inclination sensor 107 that is mounted to the conveyor frame 210. The controller 106 may be configured to cause the driving velocity to increase responsively to determining the angle of inclination has changed so the rear end 213 of the conveyor frame 210 is raised above the front end 212 of the conveyor frame 210, as illustrated in FIG. 4, and/or cause the driving velocity to decrease responsively to determining the angle of inclination has changed so the front end 212 of the conveyor frame 210 is raised above the rear end 213 of the conveyor frame 210. As used herein, the driving velocity is measured with respect to the first conveyance direction CD1 so the driving velocity increases when the rotation speed of the conveyor loop 231 in the first conveyance direction CD1 increases or the rotation speed of the conveyor loop 231 in the second conveyance direction CD2 decreases. Conversely, the driving velocity decreases when the rotation speed of the conveyor loop 231 in the first conveyance direction CD1 decreases or the rotation speed of the conveyor loop 231 in the second conveyance direction CD2 increases.

As can be appreciated from FIGS. 4-5, the driving velocity of the conveyor loop 231 increasing can help overcome the additional effects of gravity on the crop material being conveyed so the crop material flow rate to the sieve(s) 141, 142, 143 does not decrease in situations where the agricultural harvester 100 is traveling, for example, downhill. The driving velocity of the conveyor loop 231 decreasing, on the other hand, can slow down the crop material flow rate to the sieve(s) 141, 142, 143 and reduce the risk of the sieve(s) 141, 142, 143 becoming overwhelmed when, for example, the agricultural harvester 100 is traveling uphill and gravity is forcing the crop material toward the sieve(s) 141, 142, 143. The controller 106 may be configured, for example, to cause the conveyor driver 233 to rotate in the second rotation direction, which causes the conveyor loop 231 to rotate in the second conveyance direction CD2 and slow down the crop material flow rate, responsively to determining the angle of inclination has changed so the front end 212 of the conveyor frame 210 is raised above the rear end 213 of the conveyor frame 210 by a defined amount, which can be an amount that corresponds to crop material flowing across the conveyor assembly 133 toward the sieve(s) 141, 142, 143 too quickly. It should thus be appreciated that controlling the driving velocity of the conveyor loop 231 can be responsive to changes in conditions that tend to increase or decrease the crop material flow rate to the sieve(s) 141, 142, 143 unless the conveyor driver 233 selectively activates to rotate the conveyor loop 231. Selective activation of the conveyor driver 233 can thus help maintain a steady flow rate of crop material to the sieve(s) 141, 142, 143 from the threshing and separating system 130 via the conveyor assembly 133.

In some embodiments, the controller 106 is configured to determine a feed rate of crop material to the conveyor assembly 133 and responsively control the conveyor driver 233. A feed rate sensor 108 may be provided that is operably coupled to the controller 106 and configured to output a feed signal corresponding to the feed rate of crop material to the conveyor assembly 133. The feed rate sensor 108 may be, for example, an optical sensor and/or a mass sensor. The controller 106 may be configured to determine the feed rate of crop material to the conveyor assembly 133 is greater than a defined value and responsively cause a decrease in the driving velocity of the conveyor loop 231 by the conveyor driver 233, e.g., by causing the conveyor driver 233 to decrease its rotational speed in the first rotation direction or increase its rotational speed in the second rotation direction. The controller 106 may also be configured to determine the feed rate of crop material to the conveyor assembly 133 is less than a defined value and responsively cause an increase in the driving velocity of the conveyor loop 231 by the conveyor driver 233, e.g., by causing the conveyor driver 233 to increase its rotational speed in the first rotation direction or decrease its rotational speed in the second rotation direction. In some embodiments, the controller 106 may be configured to determine the feed rate of crop material to the conveyor assembly 133 based on other parameters, including but not limited to crop moisture. In this respect, the controller 106 may control the conveyor driver 233 based on crop harvesting conditions, indicated by the feed rate of crop material to the conveyor assembly 133, and/or based on other conditions that affect the flow rate of crop material within the agricultural harvester 100, such as the angle of inclination of the conveyor frame 210.

From the foregoing, it should be appreciated that the conveyor assembly 133 provided according to the present disclosure can normally shake to convey crop material, which encourages stratification, while also having a selectively activated conveyor driver 233 that can be activated to increase or decrease crop material conveyance by the conveyor assembly 133. The conveyor driver 233 can be controlled in response to various conditions that occur during operation, allowing the crop material feed rate to the sieve(s) 141, 142, 143 to be appropriately controlled. Thus, the conveyor driver 233 can be controlled to encourage steady crop material feeding to the sieve(s) 141, 142, 143 by the conveyor assembly 133 and maintain efficient operation of the cleaning system 140.

Figure 6:
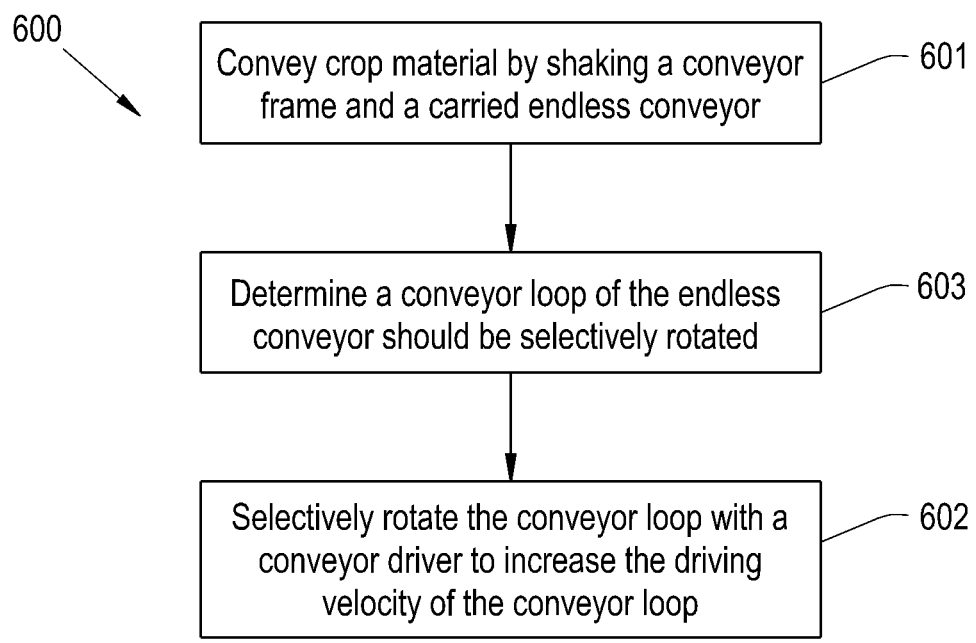
FIG. 6 illustrates a method of operating a cleaning system of an agricultural harvester, in accordance with an exemplary embodiment of the present disclosure.

Referring now to FIG. 6, an exemplary embodiment of a method 600 for controlling the cleaning system 140 of the agricultural harvester 100 is illustrated. The method 600 includes conveying 601 crop material in the first conveyance direction CD1 toward at least one sieve 141, 142, 143 by shaking the conveyor frame 210 and the carried endless conveyor 230 with the shaker 220. The method 600 further includes selectively rotating 602 the conveyor loop 231 with the conveyor driver 233 to increase or decrease the driving velocity of the conveyor loop 231. In some embodiments, selectively rotating 602 the conveyor loop 231 with the conveyor driver 233 maintains a constant crop material feed rate to the sieve(s) 141, 142, 143, relative to when the conveyor driver 233 is not driving rotation of the conveyor loop 231. The method 600 may further include determining 603 that the conveyor loop 231 should be selectively rotated by, for example, the controller 106 or otherwise. The determining 603 may include, but is not limited to, determining the feed rate of crop material to the conveyor assembly 133 has changed and/or determining the angle of inclination of the conveyor frame 210 has changed.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A cleaning system for an agricultural harvester, comprising:
    (a) at least one sieve;
    (b) a cleaning blower directed at the at least one sieve and configured to supply a cleaning air flow directed at the at least one sieve;
    (c) a conveyor assembly configured to supply crop material to the at least one sieve, the conveyor assembly comprising:
        (i) a conveyor frame;
        (ii) a shaker coupled to the conveyor frame and configured to shake the conveyor frame; and
        (iii) an endless conveyor carried by the conveyor frame and comprising a conveyor loop comprising a substantially solid surface and a conveyor driver coupled to the conveyor loop, the conveyor driver being configured to selectively rotate the conveyor loop; and
    (d) a controller operably coupled to the conveyor driver and configured to cause selective activation of the conveyor driver to rotate the conveyor loop,
    wherein the conveyor driver is configured to rotate in a first rotation direction and a second rotation direction opposite the first rotation direction, wherein rotation of the conveyor driver in the first rotation direction causes the conveyor loop to rotate in a first conveyance direction that extends from a front end of the conveyor frame toward a rear end of the conveyor frame and rotation of the conveyor driver in the second rotation direction causes the conveyor loop to rotate in a second conveyance direction that extends from the rear end of the conveyor frame toward the front end of the conveyor frame.

2. The cleaning system of claim 1, wherein the shaker is configured to shake the conveyor frame fore-to-aft such that crop material is supplied to the at least one sieve from the conveyor loop without rotating the conveyor loop.

3. The cleaning system of claim 1, wherein the surface comprises a plurality of rabbets formed therein, each of the rabbets comprising a pair of steps coupled to one another by an angled portion of the surface.

4. An agricultural harvester comprising a chassis, a threshing and separating system carried by the chassis, and the cleaning system of claim 1.

5. The cleaning system of claim 1, wherein the controller is configured to determine an angle of inclination of the conveyor frame has changed and responsively cause a change in a driving velocity of the conveyor loop by the conveyor driver.

6. The cleaning system of claim 5, wherein the controller is configured to at least one of:
    cause the driving velocity to increase responsively to determining the angle of inclination has changed so the rear end of the conveyor frame is raised above the front end of the conveyor frame; or
    cause the driving velocity to decrease responsively to determining the angle of inclination has changed so the front end of the conveyor frame is raised above the rear end of the conveyor frame.

7. The cleaning system of claim 1, wherein the controller is configured to determine a feed rate of crop material to the conveyor is less than a defined value and responsively cause an increase in a driving velocity of the conveyor loop by the conveyor driver.

8. The cleaning system of claim 1, wherein the controller is configured to cause the conveyor driver to rotate in the second rotation direction responsively to determining an angle of inclination has changed so the front end of the conveyor frame is raised above the rear end of the conveyor frame by a defined amount.

9. The cleaning system of claim 1, wherein the controller is configured to determine a feed rate of crop material to the conveyor is greater than a defined value and responsively cause a decrease in a driving velocity of the conveyor loop by the conveyor driver.

10. An agricultural harvester, comprising:
    a chassis;
    a threshing and separating system carried by the chassis, the threshing and separating system comprising a threshing rotor that is rotatable within a concave; and
    a cleaning system comprising:
        (a) at least one sieve;
        (b) a cleaning blower directed at the at least one sieve and configured to supply a cleaning air flow directed at the at least one sieve;
        (c) a conveyor assembly configured to receive crop material from the threshing and separating system and convey received crop material to the at least one sieve, the conveyor assembly comprising:
            (i) a conveyor frame;
            (ii) a shaker coupled to the conveyor frame and configured to shake the conveyor frame; and
            (iii) an endless conveyor carried by the conveyor frame and comprising a conveyor loop comprising a substantially solid surface and a conveyor driver coupled to the conveyor loop, the conveyor driver being configured to selectively rotate the conveyor loop; and
        (d) a controller operably coupled to the conveyor driver and configured to cause selective activation of the conveyor driver to rotate the conveyor loop,
        wherein the conveyor driver is configured to rotate in a first rotation direction and a second rotation direction opposite the first rotation direction, wherein rotation of the conveyor driver in the first rotation direction causes the conveyor loop to rotate in a first conveyance direction that extends from a front end of the conveyor frame toward a rear end of the conveyor frame and rotation of the conveyor driver in the second rotation direction causes the conveyor loop to rotate in a second conveyance direction that extends from the rear end of the conveyor frame toward the front end of the conveyor frame.

11. The agricultural harvester of claim 10, wherein the controller is configured to determine a feed rate of crop material to the conveyor is less than a defined value and responsively cause an increase in a driving velocity of the conveyor loop by the conveyor driver.

12. The agricultural harvester of claim 10, wherein the shaker is configured to shake the conveyor frame fore-to-aft such that crop material is supplied to the at least one sieve from the conveyor loop without rotating the conveyor loop.

13. The agricultural harvester of claim 10, wherein the surface comprises a plurality of rabbets formed therein, each of the rabbets comprising a pair of steps coupled to one another by an angled portion of the surface.

14. The agricultural harvester of claim 10, wherein the controller is configured to determine a feed rate of crop material to the conveyor is greater than a defined value and responsively cause a decrease in a driving velocity of the conveyor loop by the conveyor driver.

15. The agricultural harvester of claim 10, wherein the controller is configured to determine an angle of inclination of the conveyor frame has changed and responsively cause a change in a driving velocity of the conveyor loop by the conveyor driver.

16. The agricultural harvester of claim 15, wherein the controller is configured to at least one of:
  cause the driving velocity to increase responsively to determining the angle of inclination has changed so the rear end of the conveyor frame is raised above the front end of the conveyor frame; or
  cause the driving velocity to decrease responsively to determining the angle of inclination has changed so the front end of the conveyor frame is raised above the rear end of the conveyor frame.

17. The agricultural harvester of claim 10, wherein the controller is configured to cause the conveyor driver to rotate in the second rotation direction responsively to determining an angle of inclination has changed so the front end of the conveyor frame is raised above the rear end of the conveyor frame by a defined amount.

* * * * *